US007736664B2

(12) United States Patent
Benaddi

(10) Patent No.: US 7,736,664 B2

(45) Date of Patent: Jun. 15, 2010

(54) POLYMERIC COMPOSITION ACTING AS BARRIER TO NOXIOUS AGENTS

(75) Inventor: Hamid Benaddi, Granby (CA)

(73) Assignee: Stedfast, Inc. (CA)

( * ) Notice: Subject to any disclaimer, the term of this patent is extended or adjusted under 35 U.S.C. 154(b) by 1332 days.

(21) Appl. No.: 11/081,149

(22) Filed: Mar. 15, 2005

(65) Prior Publication Data

US 2010/0032084 A1 Feb. 11, 2010

(30) Foreign Application Priority Data

Mar. 11, 2005 (CA) .................................. 2,501,146

(51) Int. Cl.
*A01N 25/32* (2006.01)

(52) U.S. Cl. ...................................................... 424/406

(58) Field of Classification Search .................... 424/63
See application file for complete search history.

(56) References Cited

U.S. PATENT DOCUMENTS 4,833,010 A * 5/1989 Langley ...................... 442/396
4,943,475 A 7/1990 Baker et al.
5,391,426 A 2/1995 Wu
6,395,383 B1 5/2002 Maples

FOREIGN PATENT DOCUMENTS

WO PCT 03/062321 7/2003

OTHER PUBLICATIONS

Test Operations Procedure (TOP) 8-2-501. Permeation and Penetration of air-Permeable, Semipermeable, and Impermeable Materials with Chemical Agents or Simulants (Swatch testing), Office of the Undersecretary of Defense, Mar. 1997).

* cited by examiner

*Primary Examiner*—Michael G Hartley
*Assistant Examiner*—James W Rogers
(74) *Attorney, Agent, or Firm*—Drinker Biddle & Reath LLP

(57) ABSTRACT

The present application is directed to a novel composition which acts as a barrier to noxious agents while showing enhanced moisture vapour permeability and resistance to water and laundering.

18 Claims, 1 Drawing Sheet

POLYMERIC COMPOSITION ACTING AS BARRIER TO NOXIOUS AGENTS

CROSS-REFERENCE TO RELATED APPLICATIONS

This application claims priority to the Canadian Patent Application Serial No. 2,501,146, filed on Mar. 11, 2005 entitled "Polymeric Composition Acting As Barrier to Noxious Agents", which is hereby incorporated by reference in its entirety herein.

FIELD OF THE INVENTION

The present invention relates to a composition which can act as a barrier to noxious agents when applied for example to a fabric, or other solid support. The composition shows enhanced resistance to water and laundering and has better adhesion properties than commercially available membranes.

BACKGROUND OF THE INVENTION

In recent years, concern for the welfare of workers in hazardous jobs has increased considerably. In order to safeguard workers working in hazardous environments, clothing incorporating various impermeable and adsorptive materials has been used. Many of these materials have disadvantages in that they inhibit water vapor transmission and possess a finite capacity to adsorb chemicals. For example, carbon based technologies allowing water vapor transmission have limited adsorption capacity.

Moreover, the environmental impact of protective apparel remains a challenge for the industry. Concerns have arisen as to the deleterious effect of disposable clothing on the environment. There is a need to develop new protective garments that are reusable.

A preferred approach to protective garments providing comfort, flexibility and breathability relies on the use of selectively permeable materials. The use of selectively permeable materials is well known in the art and is described, for example, in U.S. Pat. Nos. 4,943,475, 5,391,426 and 6,395,383. These permeable materials are permeable only to water vapor as opposed to chemical, noxious or harmful agents. Generally, selectively permeable materials that possess high water vapor transmission are hydrophilic polymers like polyethylenimine (PEI), polyvinyl alcohol (PVOH) and polyvinyl alcohol co-ethylene. However, these water-soluble polymers offer poor chemical protection after laundering and as such cannot be considered reusable.

Therefore, there is a need to develop selectively permeable materials that offer a greater resistance to water and laundering and that have better binding properties to commercially available membranes while still acting as effective barriers against noxious or harmful agents, and while still maintaining their flexibility and breathability.

It is an object of this invention to provide a composition which has enhanced resistance to water and laundering, can better adhere to fabric or other solid supports and has enhanced water vapour permeability.

SUMMARY OF THE INVENTION

The invention relates to a composition adapted to act as a barrier against harmful or noxious agents comprising from 5 to 80% by weight of a polyvinyl acetate polymer or copolymer, from 5 to 20% by weight of an aliphatic amine, from 0 to 20% of a polyvinyl alcohol or copolymer thereof, from 0.1 to 10% by weight of a surfactant, from 0 to 5% by weight of one or more metal salts or metal oxides, from 0.1 to 10% by weight of an epoxy resin or of a cross-linking agent, from 0.5 to 10% by weight of a defoamer agent and from 10 to 90% by weight of water.

The invention also relates to a process for the preparation of a laminated support comprising: a) applying the composition of the invention to a selected support to form a laminated support; and b) curing the resulting laminated support at a temperature in the range of 100 to 220° C. If desired, the resulting laminated support may be secured to a further solid support.

DETAILED DESCRIPTION OF THE INVENTION

Figure 1:
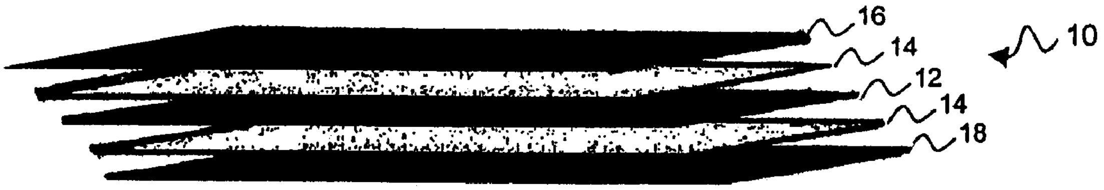
FIG. 1 is a schematic cross-sectional view of a laminated support prepared in accordance with the present invention.

As used herein, harmful or noxious agents include chemical warfare agents, toxic industrial compounds of the type set out in NFPA 1994, Standard on Protective Ensembles for Chemical/Biological Terrorism Incidents, NFPA, 2001 Edition. These include but are not limited to dichloro(2-chlorovinyl)arsine, Sarin (isopropyl methanefluorophosphonate), O-ethyl S-(2-diisopropylaminoethyl) methylphosphonothiolate, dimethyl sulfate (sulfuric acid dimethyl ester), ammonia, chlorine, cyanogen chloride, carbonyl chloride and hydrogen cyanide.

The present invention relates to a composition comprising:

(a) from 5 to 80% by weight of a polyvinyl acetate polymer or copolymer;

(b) from 5 to 20% by weight of an aliphatic amine;

(c) from 0.1 to 10% by weight of a surfactant;

(d) from 0.1 to 10% by weight of an epoxy resin or of a crosslinking agent;

(e) from 0.5 to 10% by weight of a defoamer agent; and (f) from 10 to 90% by weight of water.

The composition can also optionally comprise:

(g) from 0 to 20% by weight of polyvinyl alcohol polymer or copolymer; and (h) from 0 to 5% by weight of one or more metal salts or metal oxides.

The polyvinyl acetate provides for an improved adhesion of the composition once applied to a support while improving resistance to water and preventing it from swelling when contacted with water. A preferred polyvinyl acetate is ethylene vinyl acetate or EVA.

Aliphatic amines are water-soluble cationic polymers commonly used in ion exchange columns to remove anions from solutions. They are used as a barrier against oxygen penetration in the food industry and have been found to have good barrier properties in film form against chemical warfare agents. A preferred aliphatic amine is polyethylenimine.

Surfactants provide multifunctional properties such as reduction of the surface tension, greater resistance to washing and laundering, and foam control. Test results have shown that the addition of a surfactant to the composition allows the membrane to resist ten washing cycles at 60° C. and up to 20 dry cleaning cycles. In the absence of surfactant, delamination occurs after less than three washing cycles, even using cold water. In a preferred embodiment, 2,4,7,9-tetramethyl-5-decyne-4,7-diol can be used as a surfactant. Alternatively, Surfynol 104 can be used and then acts as both a surfactant and a defoamer.

The role of the epoxy resin or of the cross-linking agent in the composition is to increase the adhesion of the composition to the solid support and to reduce the curing time. Many types of crosslinking agents or resins can be used in the present invention and include but are not limited to aziridine, 2-dimethylaminoethanol and melamine-formaldehyde resins.

The defoamers are added to the composition to remove bubbles and to promote the formation of a film having a uniform surface. If bubbles are trapped in the film, this reduces the thickness of the film allowing chemicals to pass through it. Examples of defoamers include 2,4,7,9-tetramethyl-5-decyne-4,7-diol and other commercial products such as SURFYNOL®DF58 (Air Products), ACRYSOL®RM-2020NPR or RM-8W (Rohm and Haas), ARCOSOLV®DPNB (Lyondell), BYK®-024, -333, -348 or Disperbyk®-190 (Byk-Chemie), DOWANOL®DPnB or TPM (Dow Chemical), EXXATE®1200 (Exxon-Mobil Chemical), FOAMASTER®VF (Cognis), HEUCOPHOS®ZBZ, ZPO, ZPA ZMP, ZPZ Heucotech Ltd. (Heubach), PROGLYDE®DMM (Dow Chemical), TAFIGEL®PUR 60 (Münzing Chemie GmbH), TEXANOL®ester alcohol (Eastman Chemical), TINUVIN®384 or 292 (Ciba Specialty Chemicals), TI-PURE®R-706, or R-960 (DuPont).

Polyvinyl alcohol is a versatile water-soluble polymer used as an adhesive promoter in the preparation of films. Suitable polyvinyl alcohols for use in the present invention include, but are not limited to, combinations of low and high molecular weight Airvol 103 and Airvol 125.

Finally, metal salts or oxides can be added to provide biocidal or anti-bacterial properties without reducing the barrier properties of the composition. Preferred salts and oxides include those of copper and silver. Preferred salts and oxides include those selected from the group consisting of aluminum chloride, zinc oxide, magnesium oxide, calcium oxide, calcium carbonate, silver nitrate, and copper oxide.

To prepare the composition of the present invention, the desired amounts of polyvinyl acetate polymer or copolymer, aliphatic amine, water and optionally, polyvinyl alcohol are mixed. The solution is stirred while being heated at a temperature of between 80 to 100° C. for a period of time of 10 to 45 minutes. It will be understood by a person skilled in the art that the temperature and stirring time will vary having regard to the nature of the composition being prepared. The surfactant, the epoxy resin or crosslinking agent, the defoamer, and optionally, the metal salts are then added to the mixture.

The resulting solution is applied on a solid support as a continuous film using a knife or any known process to make a continuous film. The solid support can be, but is not limited to, a breathable or non-breathable membrane, woven or non-woven membrane, knit, textile or carbon cloth. The thickness of the gel or film on the solid support is between 5 to 100 μm and, preferably, between 30 to 70 μm, depending on the barrier properties one wishes the laminated support to have. The laminated support is cured during 1 to 7 minutes at a temperature of between 100 and 220° C. and, preferably, between 130 and 200° C. The curing period and temperatures depend on the nature of the composition and the selected solid support.

The laminated support can itself be applied to other supports depending on the properties one wishes the final product to have. Such other supports include but are not limited to expanded polytetrafluoroethylene (ePTFE), polyvinyl chloride (PVC), polyurethane (PU), polyamide polyester, or a blend thereof. One such product is illustrated in FIG. 1 and has applications in the military field as a textile used in the manufacture of protective suits and garments. The product of FIG. 1 indicated generally as 10 comprises a thin film of a composition of the invention 12 applied between two polyurethane layers 14. A textile layer 16 is then applied on one side of the resulting laminate while a tricot layer 18 is applied on the other side. It will be understood by a person skilled in the art that a laminated support can be prepared using a variety of supports, depending on the end use of one finished product and the other properties one may wish to impart to such finished product.

Example 1

Preparation of a Composition of the Invention

Using the procedure set out above, the following composition was prepared:

| Weight percentage (%) | |
|---|---|
| 16.4 | Polyvinyl alcohol (mixture of ⅓ Airvol 103 and ⅔ of Airvol 125) |
| 5 | Polyvinyl acetate (Airflex 410) |
| 16.4 | Polyethylenimine (Lupasol F WF from BASF) |
| 1 | Cross-linking agent CX-100 |
| 0.9 | Surfactant and defoamer Surfynol 104H |
| 60.3 | Water |

In the composition set out above, Surfynol 104H plays the role of both surfactant and defoamer.

Example 2

Effect of Surfactant on Ability to Withstand Laundering

A second composition, as set out below that did not contain a surfactant, was prepared using the identical procedure:

| Weight percentage (%) | |
|---|---|
| 16.4 | Polyvinyl alcohol (mixture of ⅓ Airvol 103 and ⅔ of Airvol 125) |
| 5 | Polyvinyl acetate (Airflex 410) |
| 16.4 | Polyethylenimine (Lupasol F WF from BASF) |
| 0.9 | Defoamer (Foamaster ® VF from Cognis) |
| 1 | Cross-linking agent CX-100 |
| 60.3 | Water |

The compositions of Example 1 and Example 2 were applied using a knife on two polyurethane membranes as a continuous film having a thickness of 50 μm and was cured at 150° C. for 4 minutes.

The resulting laminated products were laundered according to the ISO 6330 standard, Textiles, Domestic Washing and Drying Procedures For Textiles. Without surfactant, the composition delaminated after 2 wash/dry cycles whereas the composition with the surfactant showed no delamination after 10 wash/dry cycles.

Example 3

Resistance to Penetration of Mustard Gas

The laminated products of Example 2, prepared with and without surfactant, were tested for resistance to penetration by mustard gas (HD) according to the procedure of dynamic flow test of test Operations Procedure (TOP) 8-2-501, Permeation and Penetration of Air-Permeable, Semipermeable, and Impermeable Materials with Chemical Agents or Stimulants (Swatch testing), Office of the Undersecretary of Defense, March 1997. The test parameters were as follows:

| Parameter | Standard |
|---|---|
| Convective Flow Test Through the Swatch | Flow based on ΔP of 0.1 iwg[a] across the material. |
| Dynamic Diffusion (dual flow) | |
| Top | 0.25 L/min |
| Bottom | 0.30 L/min |
| Static Diffusion (single flow) | |
| Top | 0 L/min |
| Bottom | 1 L/min |
| Type of cell | 10 $cm^2$ area. Fitted with an agent challenge port. |
| Polyethylene film | None. |
| Challenge mass | 10 $g/m^2$ |
| Number of drops and volume of: | |
| Distilled mustard | Eight 1 μL drops |
| Relative humidity (RH) | 80 ± 8 percent |
| Agent purity | >85 percent |
| Chemical analysis method | Bubblers, solid sorbent tubes, MINICAMS ®(Miniature Automatic Continuous Air Monitoring System ®) or equivalent. |
| Length of test: | |
| Convective flow | 8 to 24 hours |
| Dynamic diffusion | 8 to 24 hours |
| Areas sampled | Top or top and bottom of each test swatch based on test requirement. |
| Test control swatches | Randomly placed. |

A polyurethane membrane was used as a control. The results are summarized in Table 1 and show that both coated membranes demonstrated significant protection against mustard gas penetration in comparison to the uncoated control membrane.

TABLE 1

Resistance of laminated products to penetration by mustard gas.

| Laminated product | HD penetration Ct mg · $min^{-3}$ |
|---|---|
| Composition of Example 1 (with surfactant) + polyurethane membrane | 1 |
| Composition of Example 2 (without surfactant) + polyurethane membrane | 5 |
| Control (polyurethane membrane) | 3320 |

It will be understood by a person skilled in the art that given the mechanisms of penetration of noxious agents through a barrier, the composition of the present invention will also show enhanced barrier properties to other chemical warfare agents and toxic industrial compounds listed in NFPA 1994 including but not limited to dichloro(2-chlorovinyl)arsine, Sarin (isopropyl methanefluorophosphonate), O-ethyl S-(2-diisopropylaminoethyl)methylphosphonothiolate, dimethyl sulfate (sulfuric acid dimethyl ester), ammonia, chlorine, cyanogen chloride, carbonyl chloride and hydrogen cyanide.

Example 4

Effect of Metal Salt

In accordance with the procedure set out above, the following composition was prepared:

| Weight percentage (%) | |
|---|---|
| 12% | Polyvinyl alcohol (Airvol 203) |
| 5% | Ethylene vinyl acetate polymer (Airflex 920) |
| 16% | Polyethylenimine (Lupasol P WF from BASF) |
| 1% | Surfactant and defoamer (Surfynol 104E) |
| 1% | Cross-linking agent CX-100 |
| 1% | Silver nitrate |
| 64% | Water |

The same composition without silver nitrate was also prepared. The compositions were applied to commercially available ePTFE membrane as described above in Example 2 and cured at 160° C. for 4 minutes. The laminated supports obtained were tested as to their resistance to penetration by mustard gas according to the procedure of dynamic flow test TOP-8-2-501. The results, presented in Table 2, indicate that the presence of silver nitrate increases resistance to mustard gas penetration.

TABLE 2

Resistance of membrane to penetration by mustard gas.

| Laminated Supports | Cumulative agent vapour penetration (μg/$cm^2$) |
|---|---|
| Composition without silver nitrate + ePTFE | 1.7 |
| Composition with silver nitrate + ePTFE | 0.3 |

Example 5

Moisture Vapor Transmission Rate

The composition of Example 4 without silver nitrate was prepared and coated as described in the same example on a ePTFE membrane. An uncoated ePTFE membrane was used as a control. The water vapor transmission rate was measured in accordance with ASTM E96BW, Annual Book of ASTM Standards, Vol 14.02. Using a water vapor permeability apparatus, the transmission rate was measured. The laminated support had a moisture vapour transmission rate at 23° C. of about 2000 $g/m^2$/24 h. The uncoated support had a moisture vapour transmission rate at 23° C. of about 4500 $g/m^2$/24 h.

Example 6

Effect of Laundering on Mustard Gas Penetration

Using the procedure set out above, the following composition was prepared:

| Weight percentage (%) | |
|---|---|
| 32% | Ethylene vinyl acetate (Airflex 920) |
| 16% | Polyethylenimine (mixture, of 1/4 of Lupasol F WF and 3/4 of Lupasol P WF from BASF) |
| 0.2% | Surfactant and defoamer (Surfynol 104H) |
| 1% | Cross-linking agent CX-100 |
| 50.8% | Water |

The composition was applied to an ePTFE membrane as a continuous film having a thickness of 50 μm and cured at 165° C. for 4 minutes. The resulting laminated supports were laundered 5 or 10 times according to ISO 6330 4B.E, were tested for their resistance to penetration by mustard gas according to the procedure of dynamic flow test TOP-8-2-501 as set out in Example 3 above. Results are shown in Table 3.

TABLE 3

Chemical resistance of the laminated support comprising ethylene vinyl acetate to mustard gas (HD).

| System | Film | Agent | Cumulative agent vapour penetration (μg/cm$^2$) 2 hrs | 4 hrs | 8 hrs |
|---|---|---|---|---|---|
| Unwashed: sample 1 | Yes | HD | 0.0 | 0.0 | 0.0 |
| Unwashed: sample 2 | Yes | HD | 0.0 | 0.0 | 0.0 |
| 5 washes at 60° C.: sample 1 | Yes | HD | 0.0 | 0.1 | 0.3 |
| 5 washes at 60° C.: sample 2 | Yes | HD | 0.0 | 0.1 | 0.3 |
| 10 washes at 60° C.: sample 1 | Yes | HD | 0.2 | 2.2 | 7.1 |
| 10 washes at 60° C.: sample 2 | Yes | HD | 0.2 | 2.6 | 8.5 |

The results obtained meet the requirement of NFPA 1994 class II. The test procedure and measurements were done in accordance with ASTM F 1154 (Standard Practice for Qualitatively Evaluating the Comfort, Fit, Function, and Integrity of Chemical Protective Suit Ensembles.

Example 7

Application for Tent Materials

In accordance with the procedure set out above, the following composition was prepared:

| Weight percentage (%) | |
|---|---|
| 50% | Ethylene vinyl acetate polymer (Airflex 920) |
| 16% | Polyethylenimine (Lupasol WF from BASF) |
| 3% | Surfactant and defoarher (Surfynol 104H) |
| 2% | Crosslinking agent CX-100 |
| 29% | Water |

The composition was applied to a polyester fabric, coated on both sides with polyvinyl chloride as a continuous film having a thickness of 50 μm, and cured at 160° C. for 4 minutes. The coated supports obtained were tested as to their resistance to penetration by mustard gas according to the procedure of dynamic flow test TOP-8-2-501. An uncoated polyester fabric, coated on both sides with polyvinyl chloride, was used as a control. The results are presented in Table 4.

TABLE 4

Resistance of membrane to penetration by mustard gas.

| Samples | Cumulative agent vapour penetration (μg/cm$^2$) after 4 hours |
|---|---|
| Coated support | 1.7 |
| Coated support | 0.3 |
| Coated support | 2.1 |
| Control (uncoated support) | 450 |

While the present invention has been described in connection with a specific embodiment thereof and in a specific use, various modifications will occur to those skilled in the art without departing from the spirit and scope of the invention as set forth in the appended claims. While the following claims are intended to recite the features of the invention, it will be apparent to those of skill in the art that certain changes may be made without departing from the scope of this invention.

The embodiments of the invention in which an exclusive property or privilege is claimed are as follows:

1. A composition for protection against harmful or noxious agents comprising a mixture of:

a) from 5 to 80% by weight of a polyvinyl acetate polymer or copolymer;
b) from 5 to 20% by weight of an polyethylenimine;
c) from 0.1 to 10% by weight of a surfactant;
d) from 0.1 to 10% by weight of an epoxy resin or of a cross-linking agent;
e) from 0.5 to 10% by weight of a defoamer agent;
f) from 10 to 90% by weight of water.

2. The composition of claim 1 further comprising:

g) from 0 to 20% by weight of a polyvinyl alcohol;
h) from 0 to 5% by weight of one or more metal salts or oxides.

3. The composition of claim 1 wherein the polyvinyl acetate is ethylene vinyl acetate.

4. The composition of claim 1 wherein the polyvinyl acetate is present in an amount of 5 to 20% by weight.

5. The composition of claim 3 wherein the ethylene vinyl acetate is present in an amount of 20 to 50% by weight.

6. The composition of claim 2 wherein the metal salts or oxides are selected from the group consisting of aluminum chloride, zinc oxide, copper oxide, magnesium oxide, calcium oxide, calcium carbonate and silver nitrate.

7. Process for the preparation of a laminated support comprising:

a) mixing together from 5 to 80% by weight of a polyvinyl acetate polymer or copolymer, from 5 to 20% by weight of an polyethylenimine, from 0 to 20% by weight of a polyvinyl alcohol and from 10 to 90% by weight of water at a temperature of 80 to 100° C.;
b) adding from 0.1 to 10% by weight of a surfactant, from 0.1 to 10% by weight of an epoxy resin or of a cross-linking agent, from 0.5 to 10% by weight of a defoamer agent, and from 0 to 5% by weight of one or more metal salts or oxides;
c) casting said composition on a solid support to yield a laminated support;
d) curing said laminated support at a temperature in the range of 100 and 220° C.

8. The process of claim 7 wherein the laminated support is cured at a temperature in the range of 130 to 200° C.

9. The process of claim 7 wherein the laminated support is cured at a temperature in the range of 130 to 170° C.

10. The process of claim 7 wherein the solid support is selected from the group consisting of ePTFE, polyurethane, poyamide, polyester or a blend of two or more thereof.

11. The process of claim 7 further comprising the step of:

e) securing the laminated support to a second solid support.

12. The process of claim 11 wherein the second solid support is selected from the group consisting of ePTFE, polyurethane, polyamide polyester or a blend of two or more thereof.

13. The process of claim 11 wherein the second solid support is secured to the laminated support by adhesive means.

14. The process of claim 7 wherein the composition is cast onto the solid support in a thickness of between 5 to 100 μm.

15. The process of claim 14 wherein the thickness is between 30 to 70 μm.

16. The process of claim 15 wherein the thickness is between 40 to 60 μm.

17. The process of claim 16 wherein the thickness is 50 μm.

18. Laminated support comprising one or more layers of a composition of any one of claims 1 to 3 or 4 to 6.

* * * * *